United States Patent [19]
Eichenmiller et al.

[11] Patent Number: 5,741,422
[45] Date of Patent: Apr. 21, 1998

[54] MOLTEN METAL FILTER CARTRIDGE

[75] Inventors: David J. Eichenmiller, Chesterland; Richard S. Henderson, Solon, both of Ohio; Robert Karel Franken, Krimpen, Netherlands

[73] Assignee: Metaullics Systems Co., L.P., Solon, Ohio

[21] Appl. No.: 524,005

[22] Filed: Sep. 5, 1995

[51] Int. Cl.⁶ .................................................. B01D 29/17
[52] U.S. Cl. .......................... 210/516.1; 210/497.01
[58] Field of Search ............................ 210/232, 238, 210/510.1, 497.01

[56] References Cited

U.S. PATENT DOCUMENTS

| | | |
|---|---|---|
| 3,006,473 | 10/1961 | Gamber . |
| 3,281,238 | 10/1966 | Bachowski . |
| 3,337,054 | 8/1967 | Sauer . |
| 3,524,548 | 8/1970 | McDonald et al. . |
| 3,747,765 | 7/1973 | Nowak . |
| 4,024,056 | 5/1977 | Yarwood et al. . |
| 4,052,198 | 10/1977 | Yarwood et al. . |
| 4,052,317 | 10/1977 | Painik . |
| 4,072,616 | 2/1978 | Rohlig ................................ 210/493.1 |
| 4,081,371 | 3/1978 | Yarwood et al. . |
| 4,113,241 | 9/1978 | Dore . |
| 4,158,632 | 6/1979 | Dantzig et al. . |
| 4,277,281 | 7/1981 | Weber et al. . |
| 4,426,287 | 1/1984 | Narumiya . |
| 4,587,016 | 5/1986 | Sumiyoshi . |
| 4,740,406 | 4/1988 | Narumiya et al. ........................ 428/73 |
| 4,790,873 | 12/1988 | Gesing et al. . |
| 4,875,519 | 10/1989 | Ishii et al. ........................ 164/465 |
| 4,964,993 | 10/1990 | Stankiewicz . |
| 5,017,287 | 5/1991 | Kuntz et al. . |
| 5,028,036 | 7/1991 | Sane et al. . |
| 5,045,111 | 9/1991 | Sane et al. . |
| 5,076,344 | 12/1991 | Fields et al. . |
| 5,104,540 | 4/1992 | Day et al. . |
| 5,126,047 | 6/1992 | Martin et al. . |
| 5,177,035 | 1/1993 | Gee et al. . |
| 5,356,720 | 10/1994 | Creber et al. . |
| 5,369,063 | 11/1994 | Gee et al. . |

*Primary Examiner*—W. L. Walker
*Attorney, Agent, or Firm*—Fay, Sharpe, Beall, Fagan, Minnich & McKee

[57] ABSTRACT

A molten metal filter medium comprised of at least two opposed wedge-shaped plates having at least one hollow generally oblong member comprised of porous ceramic material attached at a first end to one of the plates and at a second end to the second plate, at least one of the plates including a passage to an outlet communicating with the hollow member, wherein molten metal can enter the filter through the hollow member and exit the filter through the passage in the end plate.

14 Claims, 6 Drawing Sheets

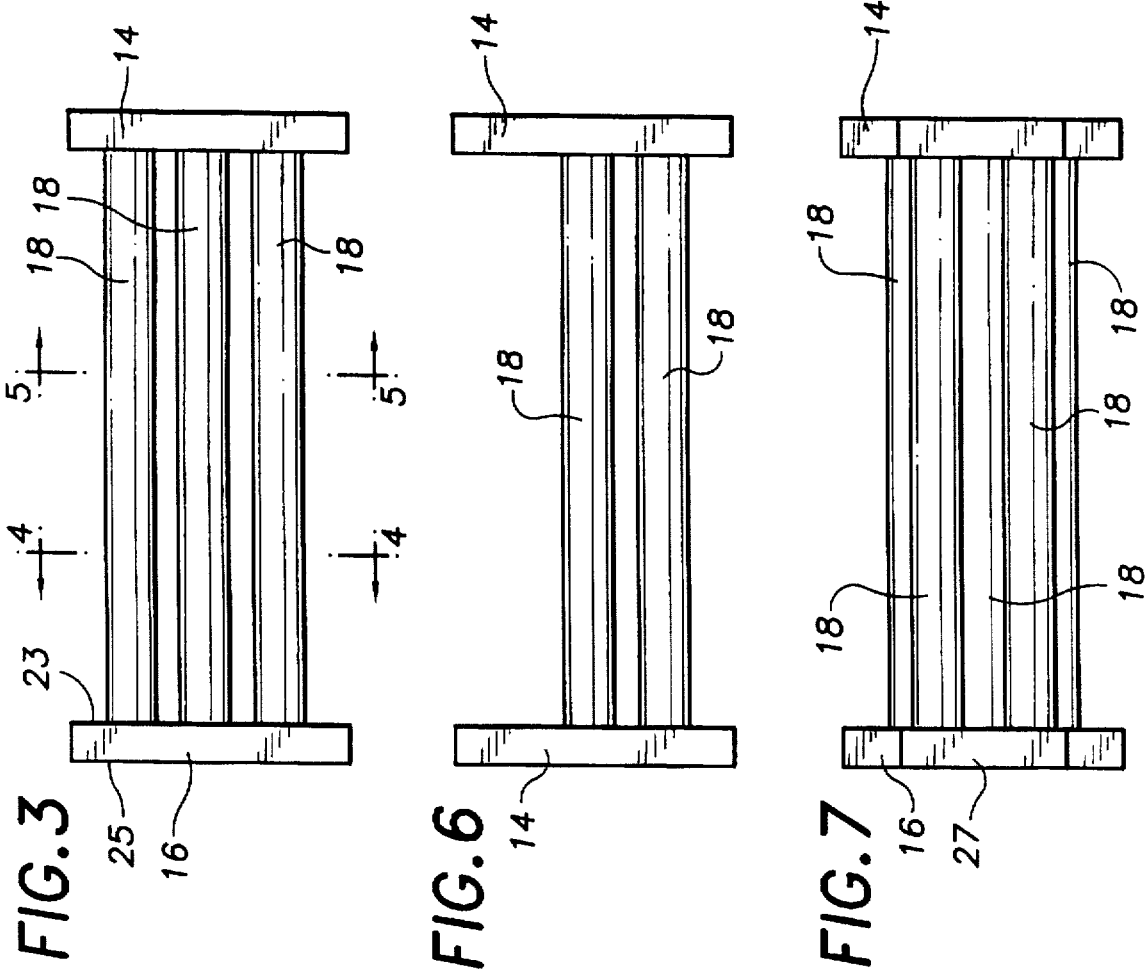

MOLTEN METAL FILTER CARTRIDGE

BACKGROUND OF THE INVENTION

1. Field of the Invention

This invention relates generally to the field of filtering impurities from molten metal. Particularly, this invention relates to a unique design of a molten metal filter. More particularly, this invention relates to an exceptionally efficient and long-lived molten metal filter which is easily inserted and removed from a molten metal casting operation.

2. Background

In the melting, refining and forming of metals, especially the casting of molten metals, it is desirable to separate inclusions from the molten metal. Such inclusions result from impurities present in the raw materials used to form the melt, from slag, dross and oxides which form on the surface of the melt, and from small fragments of the refractory material used to form the chamber or vessel in which the molten metal melt is formed. Such inclusions, if not removed from the molten state of the metal, can result in weakened points and/or porosity in the finally solidified metal body—the end product of the casting operation.

Typically, in a metal casting operation, the metal melt is formed and sometimes alloyed or otherwise refined in a furnace wherein the constituent components are added in the form of unmelted scrap and/or refined virgin metal. Low density solids tend to migrate to the surface of the melt where they either effervesce or float in combination with partially and completely solidified oxides known variously as slag and dross. These floating impurities can often be scraped from the melt's surface. However, higher density impurities tend to remain in some degree of suspension in the liquid melt and cannot be scraped or otherwise visually identified and selectively removed from the molten metal.

From a furnace the molten metal is transferred to a forming step. Transport may be accomplished with a ladle or other device. Alternatively, the molten metal may be drawn directly from the furnace and flowed through a channeling means to a mold—a process which allows continuous casting.

During the transportation or conveyance of the molten metal, it is often desirable to ensure that any remaining dross or slag, from the surface of the melt, and higher density, exogenous intermetallic inclusions submerged in the melt are removed prior to the final solidification stage. Further, additional oxides which form during the transportation of the molten metal alloy are preferably removed.

One method that is used to prevent the inclusion of exogenous intermetallic substances, including slag or dross, in the formed metal body is to filter the molten metal as it travels—by ladle or gravity channels, for example—from the melting furnace to the forming stage. A variety of means for accomplishing this filtration step are well known to those with skill in the art. Recent examples of this can be found in U.S. Pat. Nos. 4,964,993; 4,444,377; 4,426,287; 4,413,813; 4,384,888; 4,330,328; 4,330,327; 4,302,502; 4,298,187; 4,258,099; 4,179,102; 4,159,104; 4,081,371; 4,032,124; 3,869,282; and, 5,126,047, which are herein incorporated by reference.

In such systems, a filter medium or filter element of a temperature resistant material is used. Preferred materials resist deterioration from melting, chemical reaction with the metal, and erosion at elevated temperatures. The filter medium must also maintain structural integrity at such elevated temperatures and, of course, must either entrap or prevent the flow of solids, and semi-liquids by chemical reactions and/or by mechanical prevention of their flow therethrough.

Different filter designs are known to those skilled in the art. For example, U.S. Pat. No. 5,369,063, herein incorporated by reference, describes a foam filter of alumina which can be formed into a plate. In addition, U.S. Pat. No. 5,126,047 teaches a hollow rectangular prism in fluid communication with a refractory plate. Also utilized in the art are cartridge filters comprised of rectangular end plates interconnected by filtration tubes.

Cartridge filters are often considered superior filters because they possess exceptional throughput, filtration capabilities and longevity. One of the problems inherent in prior cartridge filter designs is the difficulty in installing and positioning the cartridge in a furnace well/filter box. Likewise, it is difficult to remove the cartridge filters from the furnace well/filter box. More particularly, the prior filter devices require human manipulation and hydraulic equipment to obtain a proper seal. Since the human presence and the hydraulic equipment require moderate temperatures, prior filter changes have been performed on a cooled refractory box. When the change over is performed on a "cold" box, a casting operation will typically require a second refractory box to maintain constant metal flow. In contrast, the present inventive filter allows for "hot" changes; therefore, a single refractory box can be used.

Furthermore, since filtering operations are typically conducted in production facilities by unskilled or semi-skilled labor with heavy industrial machinery, equipment and tooling, it would be desirable to have a filter which allows simple installation and removal yet provides a high degree of structural integrity and excellent filtration characteristics, and a shortened turn around time.

The present invention provides a cartridge filter which provides easy installation and removal from the furnace well without sacrifice of longevity and filtering efficiencies.

SUMMARY OF THE INVENTION

It is a primary object of this invention to provide a new and improved molten metal cartridge filter. The inventive cartridge filter is particularly effective in filtration of molten aluminum.

It is an advantage of this invention to provide a new and improved molten metal cartridge filter which may be easily installed and removed from a furnace well.

A still further advantage of this invention is to provide a new and improved molten metal cartridge filter that will reliably seat in a furnace well and allow a "quick change", facilitating single furnace operation, if desired.

Additional objects and advantages of the invention will be set forth in part in the description that follows and in part will be obvious from the description or will be learned by practice of the invention. The objects and advantages of the invention may be realized and attained by means of the instrumentalities and combinations particularly pointed out in the appended claims.

To achieve the foregoing objects and advantages in accordance with the purpose of the invention, as embodied and broadly described herein, the molten metal filter cartridge of this invention comprises two opposing wedge-shaped plates having at least one oblong member including a generally central bore mounted between opposing faces of the plates. Preferably, the plates also include at least one outward face which is beveled to further facilitate installation and removal

3 of the cartridge filter from a furnace well. The oblong member(s) are preferably comprised of a porous, refractory material which filters molten metal passing from the exterior to the bore. Preferably, the oblong members are tubular. Optionally, the ends of the oblong members can be secured: (i) with refractory cement to opposing faces of the plates; (ii) in recesses in one or both plates; or, (iii) the oblong member can extend through the entire width of the plates.

At least one of the plates includes a passage(s) in fluid communication with the bore of the oblong member(s). The passage(s) will provide fluid communication with at least one outlet located on the exterior of the plate.

When the filter cartridge is positioned in a furnace well and exposed to molten metal, the molten metal enters the filter through the hollow member(s), travels through the bore of the hollow member(s), through the passages of the plate, and exits the cartridge via the outlet.

In a preferred embodiment, the passages are holes which extend from the first face of the plate to the second face of the plate. Alternatively, the passages can be ducts extending from a face of the plate to an opening at the bottom of the plate.

In a further preferred embodiment, the face of at least one plate opposite the hollow members is covered, at least partially with an expandable gasket to more securely seal the cartridge filter and the furnace well.

Preferably, the porous, ceramic material used to construct the oblong member is alumina grit bonded with a suitable high temperature inorganic binder. Preferably, the plates are comprised of nitride bonded silicon carbide available from Norton Co., monolithic ceramic silicate available from BNZ Materials, Inc., or treated graphite available from Metaullics Systems Co. L.P.

BRIEF DESCRIPTION OF THE DRAWINGS

The invention consists of the novel parts, constructions, arrangements, combinations, and improvements shown and described. The accompanying drawings which are incorporated in and constitute a part of the specification illustrate one embodiment of the invention and, together with the description, serve to explain the principles of the invention.

Of the drawings:

FIG. 3 is a top plan view of the molten metal cartridge filter of FIG. 2;

FIG. 4 is a sectional view taken along line 4—4 of FIG. 3;

FIG. 5 is a sectional view taken along line 5—5 of FIG. 3;

FIG. 6 is a side elevation view of the cartridge filter of FIG. 2;

FIG. 7 is a bottom view of the cartridge filter of FIG. 2;

DETAILED DESCRIPTION OF THE INVENTION

Reference will now be made in detail to the present preferred embodiment of the invention, an example of which is illustrated in the accompanying drawings.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention defined by the appended claims.

Figure 1:
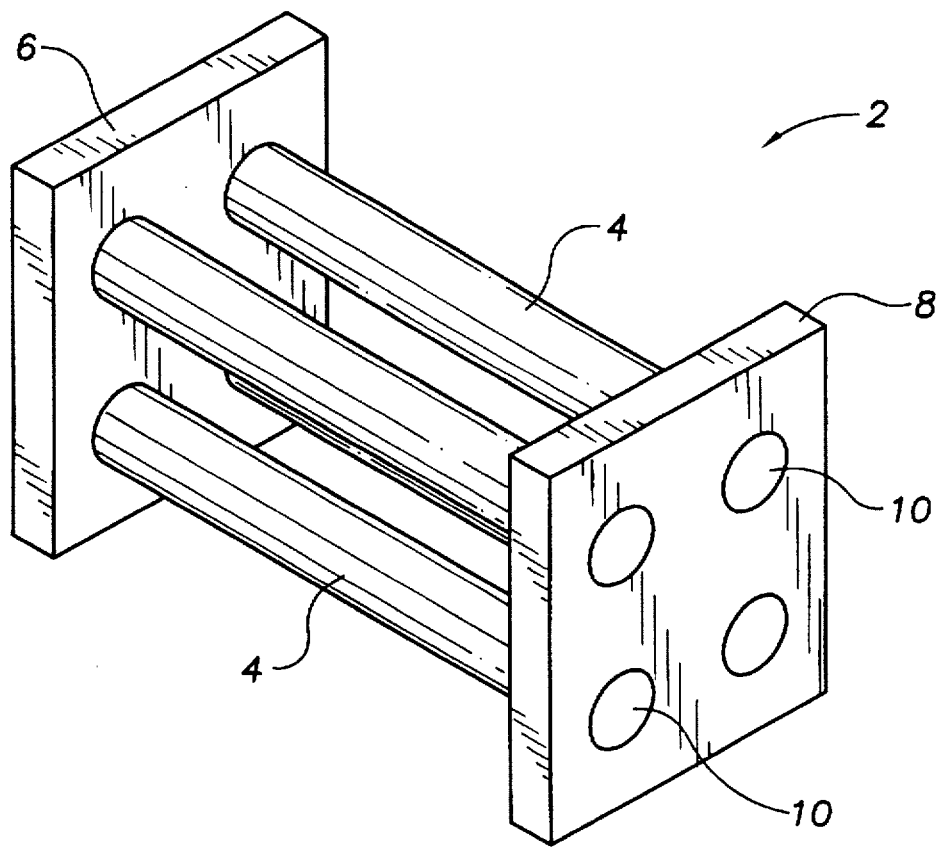
FIG. 1 is a perspective view of a molten metal cartridge filter assembly according to the prior art.
Figure 2:
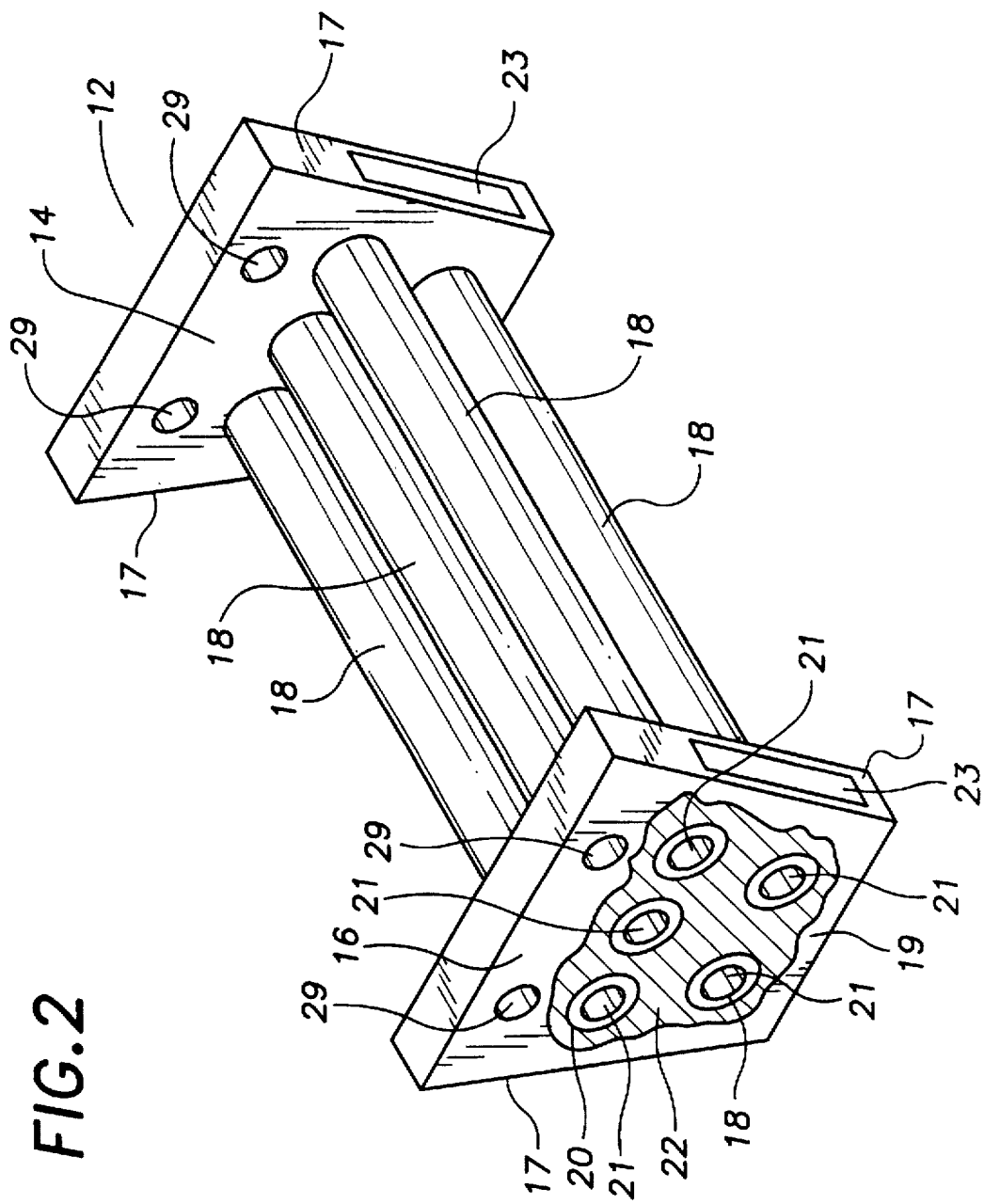
FIG. 2 is a perspective view of a molten metal cartridge filter constructed in accordance with the teachings of the present invention.

Referring to FIG. 1, a molten metal cartridge filter according to the prior art is indicated generally by the reference numeral 2. It includes four generally horizontally oriented cylindrical tubes, 4, which are connected at their ends to a pair of generally parallel plates 6 and 8. Plate 8 includes four openings 10 that communicate with hollow tubes 4. In use, the filter 2 is disposed within a filter box. When molten metal enters the furnace well, it flows through the tubes 4 and into the hollow interiors thereof, and out through the openings 10.

This unit is typically installed by a mechanical lifting device which hoists and lowers the unit in a general position. The filter is then hydraulically compressed into place and held in compression by seating with a ceramic block installed between plate 6 and the rear of a filter box. As is readily apparent, the installation process is very time consuming and complicated. Since typical molten metal casting operations are continuous, use of a single filter box requires rapid cartridge filter change capabilities, accordingly, the present inventive design is extremely valuable.

Referring now to FIGS. 2–7, it may be seen that the cartridge filter 12 of the present invention includes two opposing wedge-shaped plates 14, 16 attached to the ends of five hollow, cylindrical tubes 18 which are comprised of a porous, ceramic material. As depicted, plate 16 includes passages 20 aligned with tubes 18.

Molten metal is filtered by cartridge 12 as it enters the porous material of tubes 18 and passes to bore 21. It then travels through bore 21 of tube 18, through passage 20 and exits the cartridge filter 12. In the preferred embodiment, passages 20 are holes which extend from the first inward face 23 of plate 16 to a second outward face 25. Alternatively passages 20 could also be ducts which extend from the first face 23 of plate 16 to the bottom side 27 of the plate 16. The only requirement is that passages 20 carry the filtered molten metal to a point where it exits the filter cartridge 12.

Figure 8:
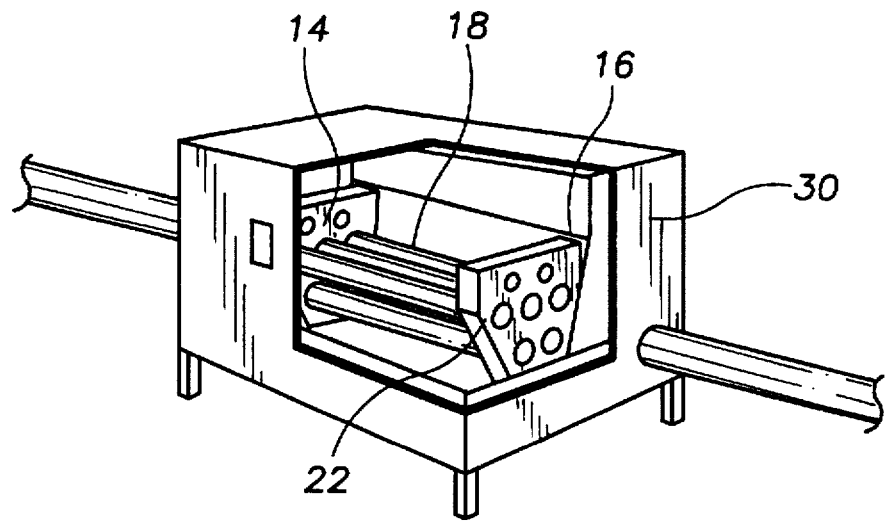
FIG. 8 is a perspective view of the cartridge filter of FIG. 2 shown in a casting furnace.
Figure 8A:
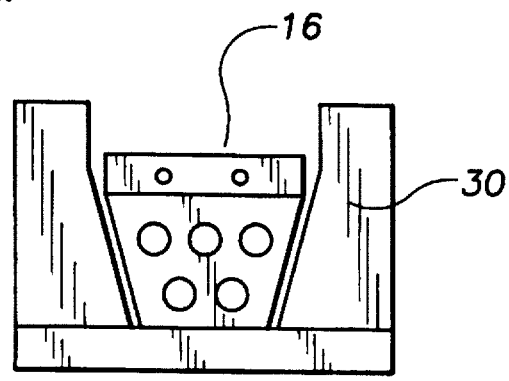
FIG. 8a is a sectional end view of the casting furnace of FIG. 8.
Figure 9:
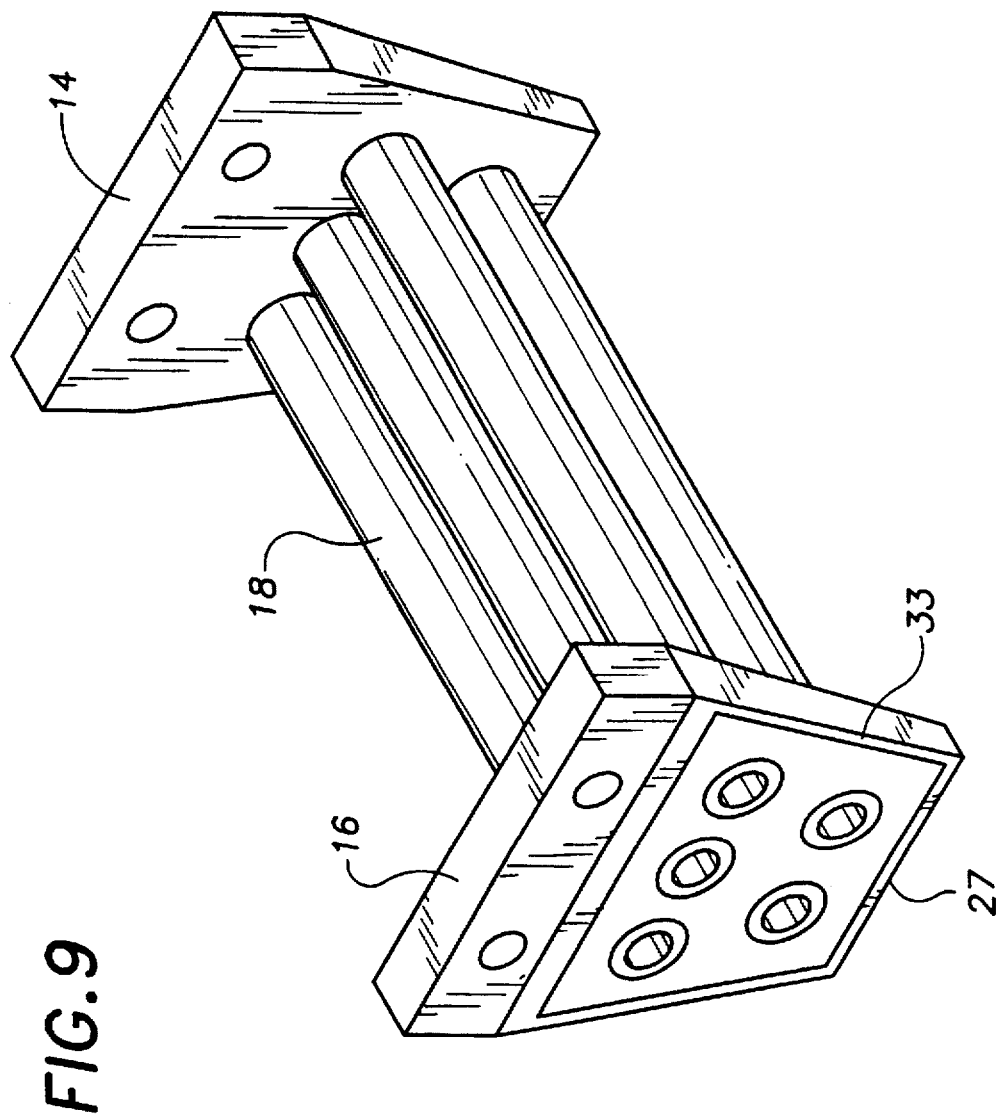
FIG. 9 is a perspective view, in partial cut-away, of a molten metal cartridge filter constructed in accordance with the teachings of the present invention.
Figure 13:
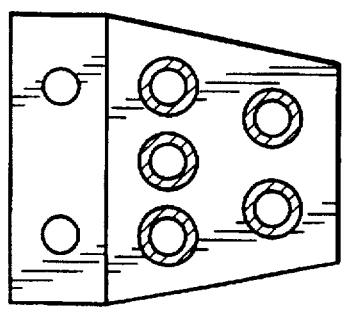
FIG. 13 is a sectional view taken along line 13—13 of FIG. 10.
Figure 14:
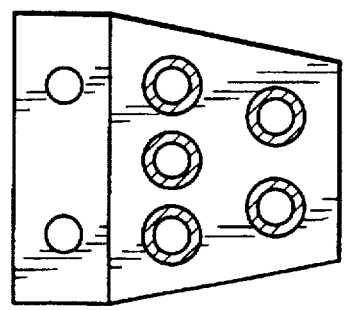
FIG. 14 is a sectional view taken along line 14—14 of FIG. 10.
Figure 10:
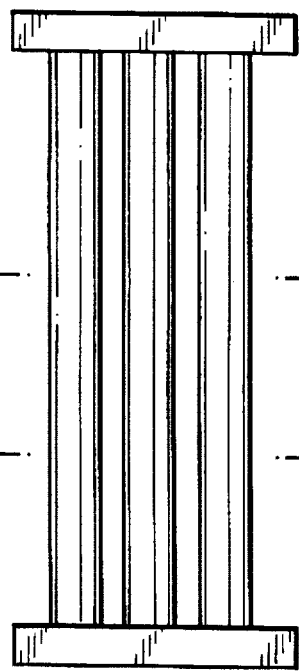
FIG. 10 is a top view of the molten metal cartridge filter of FIG. 9.
Figure 11:
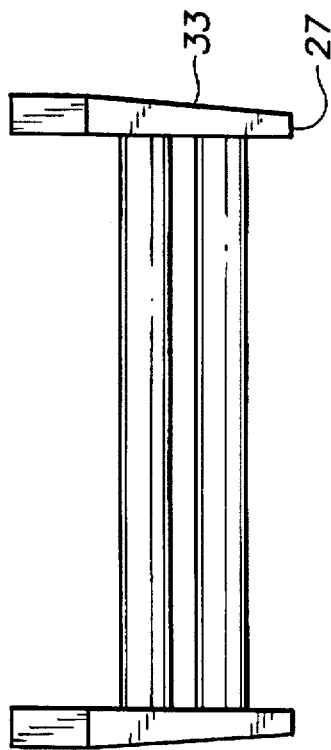
FIG. 11 is a side elevation view of the cartridge filter of FIG. 9.
Figure 12:
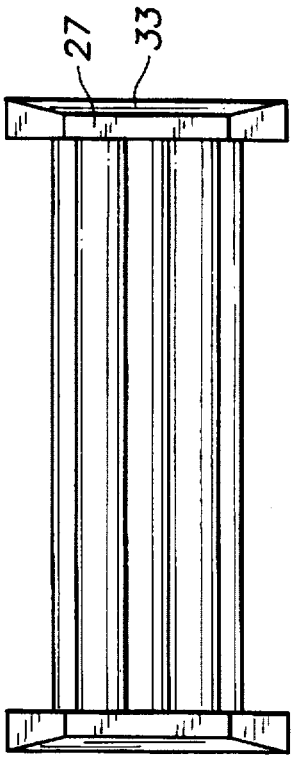
FIG. 12 is a bottom view of the cartridge filter of FIG. 9.

In accordance with the invention, plates 14 and 16 have wedge-shaped sides 17. This design assists the proper positioning of plates 14 and 16 during the installation of the filter cartridge 12 in a furnace well. Particularly, as seen in FIG. 8, the filter box 30 is designed with cooperatively shaped sidewalls which function in conjunction with the wedge-shaped end plates of cartridge filter 12 to consistently position the filter in the appropriate location. Also important is the very rapid positioning facilitated by the inventive design, as a result of the inherent self aligning characteristic of the cooperative walls. Particularly, the cartridge filter 12 can be lifted by a forklift for example—eyelets 29 are provided as connection points—and readily inserted or removed from a furnace well/filter box. Accordingly, the necessity of aligning the filter to obtain proper sealing as required by the prior art rectangular device via shims and heavy equipment, is circumvented. Also, the use of hydraulic positioning equipment—dangerous in a high temperature environment—is avoided.

In keeping with the invention, at least portions of side walls 17 and the outward facing surface 19 of plate 16 are preferably covered by a expandable gasket material 22, for example Vermiculite available from 3M, which is used to securely seal plates 14 and 16 to the furnace well and prevent leakage of unfiltered molten metal.

In a preferred embodiment, the porous, ceramic material of the hollow tubes 18 is Bonded Particle available for Metaullics Systems Co., L.P. and the material of the plates 14 and 16 is Rox-Bond Graphite available from Metaullics Systems Co., L.P. or Nitride-Bonded SiC available from Norton Co. or Carborundum, or Monolithic Ceramic Silicate available from BNZ Materials, Inc.

As shown in FIGS. 9–14, in a preferred embodiment, the plates 14 and 16 are attached to the ends of the tubes 18 and the outward surface 33 of the plates 14 and 16 adjacent the bottom is beveled. The beveled design further encourages the weight of the filter cartridge 12 to form a tight seal when the cartridge 12 is seated in the furnace well.

Thus it is apparent that there has been provided, in accordance with the invention, a molten metal filter cartridge that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

Having described the invention, the following is claimed:

1. A molten metal filter medium comprising at least two opposed wedge-shaped plates having at least one hollow generally oblong member comprised of porous ceramic material attached at a first end to one of said plates and at a second end to said second plate, at least one of said plates including a passage to an outlet communicating with said hollow member, wherein molten metal is filtered through said porous ceramic material of said hollow member exiting through said passage in said end plate.

2. A molten metal filter comprised of at least one hollow generally oblong member; and at least two opposed plates having a top and bottom, opposed first and second faces, and wedge-shaped sides, wherein said at least one oblong member is positioned between the faces of said opposed plates and at least one of said plates includes a passage communicating with said hollow member.

3. The molten metal filter of claim 2 wherein the passage is a hole extending from said first face to an outlet at said second face.

4. The molten metal filter of claim 2 wherein the passage comprises a duct extending from said first face of a plate to an outlet at said side or bottom of the plate.

5. The molten metal filter of claim 2 wherein at least portions of said sides include a gasket material.

6. The molten metal filter of claim 2 wherein the the oblong member is comprised of ceramic silicate.

7. The molten metal filter of claim 2 wherein the plate is comprised of graphite.

8. The molten metal filter of claim 2 wherein said two opposed plates attach to said at least one oblong member.

9. The molten metal filter of claim 2 wherein said oblong member includes a cross-section which is spherical.

10. The molten metal filter of claim 2 wherein at least one face of said at least one plate is beveled adjacent the bottom.

11. The molten metal filter of claim 2 further comprised of at least three hollow members.

12. The filter of claim 2 wherein said member has first and second ends are adhesively secured to said opposed plates.

13. The filter of claim 2 wherein said member has first and second ends secured in recesses in said opposed plates.

14. The filter of claim 2 wherein said member has first and second ends extending through said opposed plates.

* * * * *